United States Patent
Chang et al.

(10) Patent No.: US 12,187,947 B2
(45) Date of Patent: Jan. 7, 2025

(54) AROMATIC LIQUID CRYSTAL POLYESTER, LIQUID CRYSTAL POLYESTER COMPOSITION AND METHOD FOR MANUFACTURING LIQUID CRYSTAL POLYESTER FILM

(71) Applicant: ETERNAL MATERIALS CO., LTD., Kaohsiung (TW)

(72) Inventors: Jia-Cheng Chang, Kaohsiung (TW); Wei-Ting Yeh, Kaohsiung (TW); Wen-Cheng Liu, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 17/333,122

(22) Filed: May 28, 2021

(65) Prior Publication Data
US 2021/0371751 A1    Dec. 2, 2021

(30) Foreign Application Priority Data
Jun. 2, 2020    (TW) .................................. 109118532

(51) Int. Cl.
*C09K 19/38*    (2006.01)
(52) U.S. Cl.
CPC ................................ *C09K 19/3809* (2013.01)
(58) Field of Classification Search
CPC .................................................. C09K 19/3809
See application file for complete search history.

(56) References Cited

U.S. PATENT DOCUMENTS

| | | | | |
|---|---|---|---|---|
| 5,173,562 A | * | 12/1992 | Wilson | C08G 63/605 528/193 |
| 9,161,443 B2 | * | 10/2015 | Kim | C08G 69/44 |
| 2021/0002554 A1 | * | 1/2021 | Chu | B32B 27/08 |

FOREIGN PATENT DOCUMENTS

| | | | |
|---|---|---|---|
| JP | 62-73231 C4 | | 4/1987 |
| JP | S6273231 A | * | 4/1987 |
| JP | 1-174526 C1 | | 7/1989 |
| JP | H01174526 A | * | 7/1989 |

OTHER PUBLICATIONS

MalabikaTalukdar, et al., "Modification of Thermotropic Liquid Crystalline Polyesters by Increasing Chain Rigidity", IJRRAS, Jul. 2011, vol. 8, Issue 1, pp. 22-29 (C3).
Taiwanese Office Action issued Jun. 16, 2021.

* cited by examiner

*Primary Examiner* — Chanceity N Robinson
(74) *Attorney, Agent, or Firm* — LADAS & PARRY LLP

(57) ABSTRACT

An aromatic liquid crystal polyester, having repeating units represented by formulae (1) and (2), respectively:

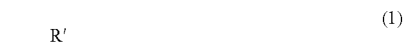
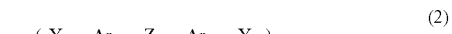

where R', $Ar_1$, $Ar_2$, $Ar_3$, X, $Y_1$, $Y_2$ and Z are those as defined in the specification. Also, a liquid crystal polyester composition including the aromatic liquid crystal polyester and a solvent. The composition has an improved viscosity stability. Also, a liquid crystal polyester film prepared from the liquid crystal polyester composition and a method for manufacturing the same. The liquid crystal polyester film has excellent properties such as a low hygroscopicity and a low dissipation factor (Df).

8 Claims, No Drawings

AROMATIC LIQUID CRYSTAL POLYESTER, LIQUID CRYSTAL POLYESTER COMPOSITION AND METHOD FOR MANUFACTURING LIQUID CRYSTAL POLYESTER FILM

BACKGROUND

1. Field of the Disclosure

The present disclosure relates to an aromatic liquid crystal polyester and a liquid crystal polyester composition including the same, and relates to a method for manufacturing a liquid crystal polyester film.

2. Description of the Related Art

At present, in mobile devices such as smart phones, tablet computers and notebook computers, the clock rate of a central processing unit is mostly above one gigahertz (GHz), so current mobile devices require a high-frequency circuit to function with a central processing unit operating at a high clock rate. In addition, the presence of water not only affects the dimensional stability of a circuit substrate, but also causes the dielectric constant of the circuit substrate to rise, affecting its performance. Since a liquid crystal polymer (LCP) film has excellent high-frequency characteristics, it is often applied to a high-frequency circuit substrate.

However, the liquid crystal polymer involved in currently marketed LCP films, especially liquid crystal polyester films, cannot be dissolved in common organic solvents. Therefore, during manufacturing of a liquid crystal polymer film, the industry usually melts the liquid crystal polymer first, and then processes it into a film by methods such as injection molding, extrusion molding, expansion molding, or blow molding. However, the molecular arrangement in the liquid crystal polymer film has a high degree of isotropy, so the shear force, heat and other factors in the above-mentioned processing method will cause the film to easily peel off or break due to external stress.

Therefore, the industry has developed a method for manufacturing a liquid crystal polymer film using a soluble LCP. Generally, the soluble LCP is soluble and has high heat resistance and good dielectric properties. However, it is known that a soluble LCP solution has a stability problem (poor viscosity stability) during storage. In addition, the soluble LCP film also has a problem of a higher hygroscopicity, resulting in a higher dissipation factor (Df), which does not meet the needs of a high-frequency circuit product. Therefore, further improvement is still needed.

In order to solve the above technical problems, the industry currently needs an LCP with excellent viscosity stability during storage, and an LCP film made of the LCP needs to have characteristics of low hygroscopicity and low Df.

SUMMARY

One object of the present disclosure is to provide an aromatic liquid crystal polyester, including repeating units represented by formulae (1) and (2), respectively:

  (1)

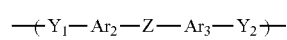  (2)

where

X is —C(=O)—, —O— or —NR'—;

R' is H or alkyl having 1 to 4 carbon atoms;

$Ar_1$ is divalent aryl selected from the group consisting of phenylene, naphthylene, biphenylene and

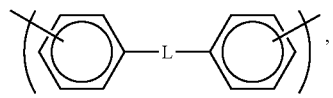

where L is a linking group, and the aryl moiety in the above-mentioned divalent aryl may be unsubstituted or substituted with alkyl having 1 to 4 carbon atoms, alkoxyl having 1 to 4 carbon atoms, aryl having 6 to 20 carbon atoms, or halogen;

$Ar_2$ and $Ar_3$ may be the same or different and each independently may be divalent aryl selected from the group consisting of phenylene, naphthylene and biphenylene, where the aryl moiety in the above-mentioned divalent aryl may be unsubstituted or substituted with alkyl having 1 to 4 carbon atoms, alkoxyl having 1 to 4 carbon atoms, aryl having 6 to 20 carbon atoms, or halogen;

$Y_1$ and $Y_2$ may be the same or different and each independently may be —O—, —NH— or —C(=O)—; and Z is

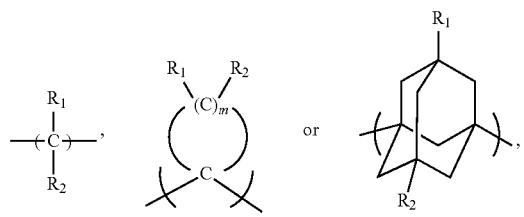

where $R_1$ and $R_2$ may be the same or different and each independently may be a hydrogen atom, alkyl having 1 to 8 carbon atoms, aryl having 6 to 15 carbon atoms, or halogen; and m is any integer from 4 to 13.

Another object of the present disclosure is to provide a liquid crystal polyester composition, including the above-mentioned aromatic liquid crystal polyester and a solvent.

Another object of the present disclosure is to provide a method for manufacturing a liquid crystal polyester film, including: applying the above-mentioned liquid crystal polyester composition onto a carrier plate to form a coating; removing the solvent from the coating; and performing heat treatment to melt the liquid crystal polyester to form a liquid crystal polyester film.

Advantages of the present disclosure include:

1. The aromatic liquid crystal polyester of the present disclosure has a hydrogen bond system and a bisphenol structure, so it can provide good solubility, and has excellent, long lasting viscosity stability in a solution, and thus has better workability and batch stability.

2. The liquid crystal polyester film prepared by the aromatic liquid crystal polyester of the present disclosure has a suitable amount of hydrogen bond units so that it can provide a lower water absorption rate (hygroscopicity) and can maintain a lower Df under high temperature and high humidity conditions. Thus, it is suitable for high-frequency circuit products.

DETAILED DESCRIPTION

The present disclosure is described with reference to the following embodiments. Aside from the following embodiments, the present disclosure may be performed according to another method without departing from the spirit of the present disclosure; and the scope of the present disclosure should not be described and limited only according to the content of this specification.

For ease of understanding of the disclosure of this specification, a plurality of terms are defined as follows.

In the present disclosure, the term "polymer" should be understood to mean a molecule having a backbone of one or more kinds of repeating units, and includes the commonly known terms "oligomer," "copolymer," "homopolymer" and analogs thereof. In addition, it should be understood that the term "polymer" may include, in addition to the polymer itself, residues from initiators, catalysts and other elements accompanying the synthesis of such polymer, where such residues are understood to be incorporated into the polymer non-covalently. In addition, although such residues and other elements are usually removed during the post-polymerization purification process, they are usually mixed or blended with the polymer, so that when the polymer is transferred between containers or between solvents or dispersion mediums, they are generally kept together with the polymer.

In the present disclosure, in a formula showing a repeating unit or a divalent substituent group, parentheses "( )" should be understood to mean the connection positions located at both ends of the repeating unit in a polymer backbone or at both ends of the divalent substituent group.

In the present disclosure, the terms "repeat unit/repeating unit" and "monomer unit" are used interchangeably and should be understood to mean a constitutional repeating unit (CRU) which is the smallest constitutional unit, and the repetition of the smallest constitutional unit constitutes a regular macromolecule, a regular oligomer molecule, a regular block or a regular chain (Pure Appl. Chem., 1996, 68, 2291). As further used herein, the term "unit" should be understood to mean that it may be a repeating unit alone or may be a structural unit that forms a constitutional repeating unit together with other units.

In the present disclosure, the term "alkyl" refers to saturated linear or branched hydrocarbyl, preferably having 1 to 20 carbon atoms, more preferably having 1 to 8 carbon atoms, and particularly preferably having 1 to 4 carbon atoms, and examples thereof include, but are not limited to, methyl, ethyl, n-propyl, isopropyl, n-butyl, isobutyl, tertiary butyl, pentyl, hexyl, and similar groups thereof.

In the present disclosure, the term "aryl" is preferably a monocyclic or polycyclic aromatic carbocyclic group having 6 to 20 carbon atoms, and may also include a fused ring, preferably 1, 2, 3 or 4 fused rings or non-fused rings, and examples thereof include, but are not limited to, phenyl, indenyl, naphthyl, fluorenyl, anthryl, phenanthryl, and similar groups thereof. According to some preferred embodiments of the present disclosure, the aryl is phenyl, biphenyl or naphthyl.

According to some preferred embodiments of the present disclosure, halogen is F, Cl or Br.

In this specification, unless otherwise stated, the term "a/an", "the", and other similar terms (especially in the appended claims) should be understood to include the singular form and the plural form.

The term "about" is used to describe a measured value, and includes an acceptable deviation. This part is determined according to the manner of measurement performed by a person of ordinary skill.

For the term "or" in two or more lists, the following descriptions are included: any item of the list, all items of the list, and any combination of items of the list.

Aromatic Liquid Crystal Polyester

The aromatic liquid crystal polyester of the present disclosure has good solubility and excellent, long lasting viscosity stability in a solution. In addition, a liquid crystal polyester film prepared from the aromatic liquid crystal polyester of the present disclosure has a lower hygroscopicity and a lower Df, so the liquid crystal polyester film is suitable for a high-frequency circuit product.

The aromatic liquid crystal polyester of the present disclosure at least includes two different repeating units represented by formulae (1) and (2), respectively:

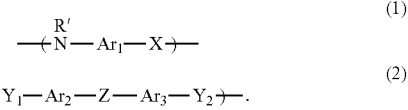

$$\text{(1)}$$
$$\text{(2)}$$

According to some embodiments of the present disclosure, in the repeating unit represented by formula (1), X is —C(═O)—, —O— or —NR'—, preferably C(═O)— or —O—; and R' independently may be H or alkyl having 1 to 4 carbon atoms, preferably H.

According to some embodiments of the present disclosure, in the repeating unit represented by formula (1), $Ar_1$ may be divalent aryl, preferably divalent aryl selected from the group consisting of phenylene (such as 1,4-phenylene or 1,3-phenylene), naphthylene (such as 2,6-naphthylene or 1,5-naphthylene), biphenylene (such as 4,4'-biphenylene) and

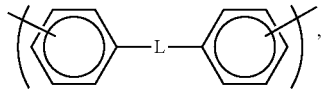

where L is a linking group, such as —O—, —S—, —S(═O)$_2$—, —C(═O)— or $C_1$-$C_4$ alkylene. The aryl moiety in the above-mentioned divalent aryl may be unsubstituted or substituted with alkyl having 1 to 4 carbon atoms, alkoxyl having 1 to 4 carbon atoms, aryl having 6 to 20 carbon atoms, or halogen.

In the aromatic liquid crystal polyester of the present disclosure, the repeating unit (1) can be derived from a corresponding amino-containing aromatic compound, including but not limited to: aromatic aminocarboxylic acid, aromatic hydroxylamine or aromatic diamine, preferably aromatic aminocarboxylic acid or aromatic hydroxylamine.

Examples of the above-mentioned aromatic aminocarboxylic acid include, but are not limited to, 3-aminobenzoic acid, 4-aminobenzoic acid or 6-amino-2-naphthoic acid, or derivatives of these compounds where the aryl moiety is substituted with alkyl, alkoxyl, aryl or halogen, or ester-forming derivatives or amide-forming derivatives of these compounds (such as acylates).

Examples of the above-mentioned aromatic hydroxylamine include, but are not limited to, 3-aminophenol, 4-aminophenol, 4-amino-4'-hydroxybiphenyl, 4-amino-1-naphthol, 5-amino-1-naphthol or 8-amino-2-naphthol, or derivatives of these compounds where the aryl moiety is substituted with alkyl, alkoxyl, aryl or halogen, or ester-forming derivatives or amide-forming derivatives of these compounds (such as acylates, such as 4-acetamidophenol).

Examples of the above-mentioned aromatic diamine include, but are not limited to, 1,3-phenylenediamine, 1,4-phenylenediamine, 4,4'-diaminodiphenyl sulfide, 4,4'-diaminodiphenyl sulfone, 4,4'-diaminodiphenyl ether, 1,5-naphthalene diamine or 1,8-naphthalene diamine, or derivatives of these compounds where the aryl moiety is substituted with alkyl, alkoxyl, aryl or halogen, or ester-forming derivatives or amide-forming derivatives of these compounds (such as acylates).

According to some specific embodiments of the present disclosure, examples of the repeating unit (1) include, but are not limited to, repeating units derived from 4-aminobenzoic acid and/or 4-aminophenol. The liquid crystal polyester may include two or more repeating units.

According to some embodiments of the present disclosure, the above-mentioned amino-containing aromatic compound may react with other monomers to form a unit represented by formula (1-1):

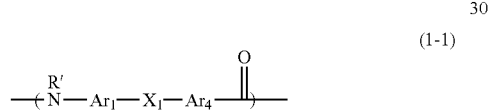
(1-1)

where $X_1$ is a carboxylate group (—C(=O)—O— or —O—C(=O)—) or an amide group (—NR'C(=O)— or —C(=O)NR'—), where $R^1$ is H or alkyl having 1 to 4 carbon atoms, and $Ar_4$ may be the same as or different from $Ar_1$ and has the definition as $Ar_1$. The unit represented by formula (1-1) may be formed by the reaction of aromatic aminocarboxylic acid and aromatic hydroxycarboxylic acid ($X_1$ is —C(=O)—O—), formed by the reaction of aromatic hydroxylamine and aromatic dicarboxylic acid ($X_1$ is O—C(=O)—), formed by the reaction of aromatic diamine and aromatic dicarboxylic acid ($X_1$ is —NR'C(=O)—), or formed by the reaction of aromatic aminocarboxylic acid and another aromatic aminocarboxylic acid ($X_1$ is C(=O)NR'—). Without affecting the effect of the present disclosure, any appropriate aromatic hydroxycarboxylic acid, aromatic dicarboxylic acid or another aromatic aminocarboxylic acid known to those of ordinary skill in the art to which the present disclosure belongs may be used to react with the above-mentioned amino-containing aromatic compound to form the unit represented by formula (1-1).

According to some specific embodiments of the present disclosure, examples of the unit represented by formula (1-1) include, but are not limited to, units derived from m-phthalic acid, 6-hydroxy-2-naphthoic acid, 4-aminobenzoic acid, 4-aminophenol and 4-acetamidophenol.

According to some embodiments of the present disclosure, the repeating unit represented by formula (1) accounts for 10 to 35 mole percentage, 11 to 32 mole percentage, 12 to 30 mole percentage, 13 to 28 mole percentage, 14 to 25 mole percentage or 15 to 20 mole percentage in the aromatic liquid crystal polyester, or accounts for any mole percentage between the above-mentioned two end points. When the mole percentage of the repeating unit represented by formula (1) in the aromatic liquid crystal polyester is too low (e.g. less than 10%), it will cause poor solubility of the aromatic liquid crystal polyester, which is not conducive to subsequent processing and applications. When the mole percentage of the repeating unit represented by formula (1) in the aromatic liquid crystal polyester is too high (e.g. higher than 35%), it will cause a too high hygroscopicity of the aromatic liquid crystal polyester, which will affect the dimensional stability of a circuit substrate, and also cause the dielectric constant of the circuit substrate to rise, affecting its performance.

In the present disclosure, $Y_1$ and $Y_2$ in the repeating unit represented by formula (2) each independently may be —O—, —NR'— or —C(=O)—, and R' is as defined above. According to some preferred embodiments of the present disclosure, $Y_1$ and $Y_2$ are preferably —O—.

In the present disclosure, Z in the repeating unit represented by formula (2) is:

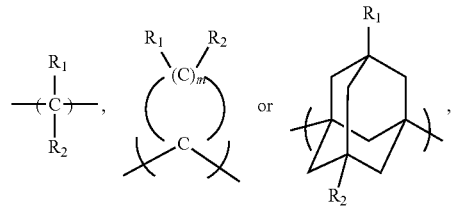

where $R_1$ and $R_2$ may be the same or different and each independently may be a hydrogen atom, alkyl having 1 to 8 carbon atoms (preferably alkyl having 1 to 4 carbon atoms, including but not limited to, methyl, ethyl or propyl), aryl having 6 to 15 carbon atoms (preferably phenyl) or halogen; and m is any integer from 4 to 13, such as 4, 5, 6, 7, 8, 9, 10, 11, 12 or 13.

According to some embodiments of the present disclosure, Z in the repeating unit represented by formula (2) is

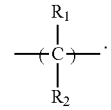

In some embodiments, $R_1$ and $R_2$ each independently may be hydrogen or alkyl having 1 to 4 carbon atoms, and $R_1$ and $R_2$ each are preferably hydrogen or methyl independently.

According to some embodiments of the present disclosure, Z in the repeating unit represented by formula (2) is

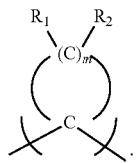

For example, Z may be cyclopentylene, cyclohexylene, cycloheptylene, cyclooctylene, cyclononylene, cyclodecylene, cycloundecylene, cyclododecylene or cyclotridecylene substituted with one or more $R_1$ and $R_2$. According to some specific embodiments in the present disclosure, Z is

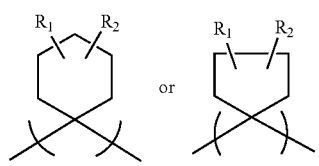

In some embodiments, $R_1$ and $R_2$ each independently may be hydrogen or alkyl having 1 to 4 carbon atoms, and $R_1$ and $R_2$ each are preferably hydrogen or methyl independently.

According to some embodiments of the present disclosure, Z in the repeating unit represented by formula (2) is

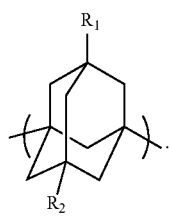

In some embodiments, $R_1$ and $R_2$ each independently may be hydrogen or alkyl having 1 to 4 carbon atoms, and each preferably hydrogen or methyl independently.

According to some embodiments of the present disclosure, $Ar_2$ and $Ar_3$ in the repeating unit represented by formula (2) may be the same or different and each independently may be divalent aryl selected from the group consisting of phenylene (such as 1,4-phenylene or 1,3-phenylene), naphthylene (such as 2,6-naphthylene or 1,5-naphthylene) and biphenylene (such as 4,4'-biphenylene). The aryl moiety in the above-mentioned divalent aryl may be unsubstituted or substituted with alkyl having 1 to 4 carbon atoms, alkoxyl having 1 to 4 carbon atoms, aryl having 6 to 20 carbon atoms, or halogen.

In the aromatic liquid crystal polyester of the present disclosure, the repeating unit (2) may be derived from a corresponding aromatic compound, including but not limited to: aromatic dicarboxylic acid, aromatic diol, aromatic hydroxycarboxylic acid, aromatic aminocarboxylic acid, aromatic hydroxylamine or aromatic diamine, preferably aromatic dicarboxylic acid, aromatic diol or aromatic hydroxycarboxylic acid, and more preferably aromatic diol.

According to some preferred embodiments of the present disclosure, the repeating unit represented by formula (2) is derived from, but not limited to, the following compounds: aromatic diamine (when $Y_1$ and $Y_2$ are —NH—), aromatic diol (when $Y_1$ and $Y_2$ are —O—), aromatic dicarboxylic acid (when $Y_1$ and $Y_2$ are —C(=O)—), aromatic hydroxylamine (when one of $Y_1$ and $Y_2$ is —NH— and the other one is —O—), aromatic hydroxycarboxylic acid (when one of $Y_1$ and $Y_2$ is —C(=O)— and the other one is —O—), and aromatic aminocarboxylic acid (when one of $Y_1$ and $Y_2$ is —NH— and the other one is —C(=O)—).

According to some specific embodiments of the present disclosure, examples of the repeating unit (2) include, but are not limited to, repeating units derived from 4,4'-cyclohexylene biphenol, 4,4'-cyclopentylene biphenol, 1,1-bis(4-hydroxyphenyl)cyclododecane (BisP-CDE) and 1,1-bis(4-hydroxyphenyl)ethane (bisphenol E). The liquid crystal polyester may include two or more repeating units.

According to some embodiments of the present disclosure, the repeating unit represented by formula (2) accounts for 1 to 15 mole percentage, 2 to 14 mole percentage, 3 to 13 mole percentage, 4 to 12 mole percentage, 5 to 11 mole percentage, 6 to 10 mole percentage or 7 to 9 mole percentage in the aromatic liquid crystal polyester, or accounts for any mole percentage between the above-mentioned two end points. When the mole percentage of the repeating unit represented by formula (2) in the aromatic liquid crystal polyester is too low (e.g. less than 1%), it will cause poor solubility of the aromatic liquid crystal polyester, which is not conducive to subsequent applications. When the mole percentage of the repeating unit represented by formula (2) in the aromatic liquid crystal polyester is too high (e.g. higher than 15%), the aromatic liquid crystal polyester is not in a liquid crystal phase and is not capable of being used as the material for high-frequency dielectric applications.

According to some embodiments of the present disclosure, the mole ratio of the repeating unit represented by formula (1) to the repeating unit represented by formula (2) may be, but is not limited to, a value between 4:1 and 1:1, such as 4:1, 3.5:1, 3:1, 2.5:1, 2:1, 1.5:1 or 1:1.

The constituent monomers of the aromatic liquid crystal polyester of the present disclosure may optionally include, in addition to the monomers from which the repeating units represented by formulae (1) and (2) may be derived, other appropriate monomers, such as aromatic dicarboxylic acid, aromatic diol, aromatic hydroxycarboxylic acid, aromatic aminocarboxylic acid, aliphatic dicarboxylic acid and aliphatic diol, well known to those of ordinary skill in the art of the present disclosure. Examples of the above-mentioned aromatic dicarboxylic acid, aromatic diol and aromatic hydroxycarboxylic acid are illustrated below (but not limited thereto):

Aromatic dicarboxylic acid: Terephthalic acid, m-phthalic acid, 3,3'-diphenyl dicarboxylic acid, 4,4'-diphenyl dicarboxylic acid, 1,4-naphthalic acid, 1,5-naphthalic acid, 2,6-naphthalic acid, 3,3'-dicarboxylic acid diphenyl ether, 4,4'-dicarboxylic acid diphenyl ether and the like, or derivatives of these compounds where the aryl moiety is substituted with alkyl, alkoxyl, aryl or halogen, or ester-forming derivatives or amide-forming derivatives of these compounds (such as acylates).

Aromatic diol: Hydroquinone, resorcinol, 4,4'-dihydroxy diphenyl, 3,3'-dihydroxy diphenyl ether, 4,4'-dihydroxy diphenyl ether, 4,4'-dihydroxy diphenyl sulfone, 4,4'-dihydroxy diphenyl sulfide, 1,5-naphthalenediol, 2,6-naphthalenediol and the like, or derivatives of these compounds where the aryl moiety is substituted with alkyl, alkoxyl, aryl or halogen, or ester-forming derivatives or amide-forming derivatives of these compounds (such as acylates).

Aromatic hydroxycarboxylic acid: 3-Hydroxybenzoic acid, 4-hydroxybenzoic acid, 6-hydroxy-2-naphthoic acid, 7-hydroxy-2-naphthoic acid, 6-hydroxy-2-naphthoic acid, 4'-hydroxybiphenyl-4-carboxylic acid and the like, or derivatives of these compounds where the aryl moiety is substituted with alkyl, alkoxyl, aryl or halogen, or ester-forming derivatives or amide-forming derivatives of these compounds (such as acylates).

The present disclosure further provides an aromatic liquid crystal polyester composed of the following monomers:
(i) aromatic hydroxylamine, aromatic aminocarboxylic acid or aromatic diamine having an aryl moiety $Ar_1$; and
(ii) aromatic diol having a formula HO—$Ar_2$—Z—$Ar_3$—OH,
where Z, $Ar_1$, $Ar_2$ and $Ar_3$ are as defined.

A Method for Manufacturing Aromatic Liquid Crystal Polyester

The method for manufacturing the aromatic liquid crystal polyester of the present disclosure will be briefly described below.

In the present disclosure, after appropriate monomers are selected, the aromatic liquid crystal polyester of the present disclosure may be manufactured by various known methods. In some embodiments of the present disclosure, the aromatic liquid crystal polyester may be manufactured by polymerizing the monomers directly. In some other embodiments of the present disclosure, firstly, the monomers from which the repeating units represented by formulae (1) and (2) may be derived (or other monomers) are converted to ester-forming derivatives or amide-forming derivatives thereof, and then, the derivatives are polymerized to manufacture the aromatic liquid crystal polyester. The manufacturing method will be described below with reference to examples by taking ester-forming derivatives or amide-forming derivatives as examples. However, the method for manufacturing the aromatic liquid crystal polyester of the present disclosure is not limited thereto.

The above-mentioned ester-forming derivatives include, but are not limited to, compounds obtained by converting a carboxylic group or hydroxyl group, which has lower reactivity in the monomer, to a group having higher reactivity, such as a halogenated acyl group, acid anhydride or ester. The ester-forming derivative may further form a polyester (for example, by transesterification reaction). For example, an ester-forming derivative of a compound with a carboxylic group may be the acyl chloride or acid anhydride of the compound, wherein the carboxylic group exists in a form of the acyl chloride or acid anhydride and reacts with alcohols to form an ester, and then, a transesterification reaction is performed to form a polyester. An ester-forming derivative of a compound with a hydroxyl group may be an ester formed by reacting the hydroxyl group of the compound with carboxylic acid, in which case a transesterification reaction is performed to form a polyester.

Similarly, the above-mentioned amide-forming derivatives include, but are not limited to, those in which an amino group may be converted to a reactive group (such as an amide group) that easily forms an amide bond. The amide-forming derivative may further form a polyamide. In a specific embodiment of the present disclosure, the amide-forming derivative is 4-acetamidophenol.

In the present disclosure, an acylation reaction may be performed on relevant monomers by means of fatty acid anhydrides to prepare the above-mentioned ester-forming derivatives or amide-forming derivatives. The fatty acid anhydrides used in the acylation reaction of the present disclosure are not particularly limited and may include acetic anhydride, propionic anhydride, butyric anhydride, isobutyric anhydride, valeric anhydride, trimethylacetic anhydride, 2-ethylhexoic acid, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and analogs, or a mixture of two or more of the above anhydrides. From the viewpoint of price and ease of processing, the fatty acid anhydride is preferably acetic anhydride, propionic anhydride, butyric anhydride or isobutyric anhydride, and more preferably acetic anhydride. Such fatty acid anhydrides are eventually released from products in the form of corresponding fatty acids. For example, fatty acid anhydrides may be used to increase the reactivity of monomers for polymerization, in which case fatty acid by-products will be formed after the reaction, and the above-mentioned fatty acid by-products and unreacted fatty acid anhydrides may be removed by common methods, such as a distillation method, to achieve the purpose of transfer balance.

Catalysts may be added to the acylation reaction and the transesterification reaction. The added catalysts may be known catalysts used for the polymerization reaction of polyesters, which may include, but not limited to: metal salt catalysts, such as magnesium acetate, tin acetate, tetrabutyl titanate, lead acetate, potassium acetate, antimony trioxide or analogs; or organic catalysts, such as N,N'-dimethylaminopyridine, N-methylimidazole or analogs. The above-mentioned catalysts are preferably heterocyclic compounds having two or more nitrogen atoms, such as N,N'-dimethylaminopyridine or N-methylimidazole. These catalysts are generally added when monomers are added, and do not need to be removed after acylation. If the catalysts are not removed, the catalysts may be used in the transesterification reaction.

The polycondensation reaction generated by transesterification is usually performed in the melt polymerization reaction, and the melt polymerization reaction and the solid phase polymerization reaction may be used together. Preferably, a polymer may be taken from a melt polymerization process, and then, the polymer is ground into powder or a sheet so as to be used for the solid phase polymerization reaction. The solid phase polymerization reaction is, for example, but not limited to, performed in an inert gas (such as nitrogen) at a temperature of about 20 to 350° C. for 1 to 30 h. The solid phase polymerization reaction may be performed under stirring, or may alternatively be performed at rest without stirring. In addition, the melt polymerization reaction and the solid phase polymerization reaction may be performed in the same reaction vessel which can provide or be equipped with an appropriate stirring mechanism. After the solid phase polymerization reaction, the prepared aromatic liquid crystal polyester may be granulated or molded by a known method.

The method for producing the aromatic liquid crystal polyester may be performed by using a batch-type device, a continuous device or other devices.

Aromatic Liquid Crystal Polyester Composition

The aromatic liquid crystal polyester of the present disclosure has good solubility in a solvent and may be stably dissolved in the solvent. Therefore, the present disclosure further provides an aromatic liquid crystal polyester composition including a solvent and the above-mentioned aromatic liquid crystal polyester. Therefore, in the present disclosure, the aromatic liquid crystal polyester composition may be applied to a carrier plate by means of coating and heated to form a liquid crystal polyester film, and as a result, the obtained liquid crystal polyester film has uniform directivity.

In the aromatic liquid crystal polyester composition of the present disclosure, the content of solid components in the aromatic liquid crystal polyester is greater than 1 wt % (based on the total weight of the composition), preferably between 1 wt % and 35 wt %, such as 1 wt %, 2 wt %, 3 wt %, 5 wt %, 10 wt %, 15 wt %, 20 wt %, 25 wt %, 30 wt %, or 35 wt %. The aromatic liquid crystal polyester obtained by the present disclosure has good solubility, and the solubility may be about 1% or more and may be up to about 35% or more. The solubility of the aromatic liquid crystal polyester may be about 1% to about 35% in some embodiments, about 2% to about 30% in some embodiments, and about 5% to about 25% in some other embodiments. In the present disclosure, the "solubility" of a polymer is calculated by dividing the maximum weight of a polymer which may be added to a solvent without phase separation by the total weight of the composition and then multiplying by 100.

According to some preferred embodiments of the present disclosure, solvents suitable for the aromatic liquid crystal polyester composition of the present disclosure include, but are not limited to, N-methyl-2-pyrrolidone, N,N-dimethyl-acetamide, γ-butyrolactone, or dimethyl formamide. According to some specific embodiments of the present disclosure, the solvent is N-methyl-2-pyrrolidone.

Conventional fillers, additives or analogs may be added to the aromatic liquid crystal polyester composition of the present disclosure. The aromatic liquid crystal polyester composition according to the present disclosure may include one or more additives, such as inorganic fillers, organic fillers, high dielectric filling agents such as barium titanate or strontium titanate, whiskers such as potassium titanate or aluminum borate, silane coupling agents, antioxidants, or UV absorbents, but are not limited thereto.

According to some preferred embodiments of the present disclosure, the aromatic liquid crystal polyester composition includes organic fillers or inorganic fillers.

Method for Manufacturing Liquid Crystal Polyester Film

A method for manufacturing a liquid crystal polyester film according to the present disclosure includes: applying the above-mentioned liquid crystal polyester composition onto a carrier plate to form a coating; removing the solvent from the coating; and performing heat treatment to melt the liquid crystal polyester to form a liquid crystal polyester film.

In the method of the present disclosure, the liquid crystal polyester composition may be applied to a carrier plate by using any commonly known technology capable of applying a solution to a substrate, such as but not limited to: casting, roller coating, dip coating, spray coating, spin coating, curtain coating, slit coating, screen printing, bar coating, and the like.

According to some preferred embodiments of the present disclosure, the material of the carrier plate may be metal, glass or plastic. According to some preferred embodiments of the present disclosure, the thickness of the carrier plate is preferably 7 to 35 μm.

In the method of the present disclosure, the method for removing the solvent is not particularly limited, and may be preferably performed by solvent evaporation. Examples of solvent evaporation methods may include heating, pressure reduction, ventilation and the like. From the viewpoint of production efficiency and ease of processing, heating evaporation is preferred, and ventilation in combination with heating evaporation is more preferred. According to some preferred embodiments of the present disclosure, heating conditions for removing solvents include pre-drying at a temperature of 60° C. or higher and 150° C. or lower for 10 min to 2 h. Generally (without being bound by theory), in this step, liquid crystal polymers in the coating are disordered.

After the above-mentioned solvent removing step, heat treatment is performed to obtain a liquid crystal polyester film. The above-mentioned heat treatment is an annealing step, preferably performed at a temperature of 250° C. or higher. For example, the heat treatment is performed by heating at a temperature of 250 to 350° C. for 1 to 12 h. Generally (without being bound by theory), in this step, the liquid crystal polymers may be oriented and randomly rearranged by heating and have uniform directivity, so the strength of the obtained liquid crystal polyester film can be enhanced.

EXAMPLES

Synthesis Example 1

99.7 g (0.6 mol) of m-phthalic acid, 158.1 g (0.84 mol) of 6-hydroxy-2-naphthoic acid, 49.4 g (0.36 mol) of p-aminobenzoic acid, 89.4 g (0.48 mol) of 4,4'-dihydroxy diphenyl, 25.7 g (0.12 mol) of bisphenol E and 269.5 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and by-product acetic acid and unreacted acetic anhydride were distilled off at the same time. Subsequently, the residual acetic acid was removed by vacuuming at 300° C. When the torque rose rapidly, the reaction was terminated, and reactants were discharged to obtain a liquid crystal polyester I in which the intrinsic viscosity (I.V.) was 0.9 dL/g. In the liquid crystal polyester I, the mole percentages of the repeating units represented by formulae (1) and (2) according to the present disclosure were 15% and 5%, respectively, and were calculated by dividing the number of moles of the p-aminobenzoic acid or the number of moles of the bisphenol E that may be regarded as a limiting reagent respectively by the number of moles of total reactants (excluding the acetic anhydride), where the content of the acetic anhydride in the obtained product structure was substantially negligible.

Synthesis Example 2

99.7 g (0.60 mol) of m-phthalic acid, 158.1 g (0.84 mol) of 6-hydroxy-2-naphthoic acid, 49.4 g (0.36 mol) of p-aminobenzoic acid, 67.0 g (0.36 mol) of 4,4'-dihydroxy diphenyl, 61.0 g (0.24 mol) of 4,4'-cyclopentylene biphenol and 269.5 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and acetic acid and unreacted acetic anhydride were distilled off at the same time. Subsequently, the residual acetic acid was removed by vacuuming at 300° C. When the torque rose rapidly, the reaction was terminated, and reactants were discharged to obtain a liquid crystal polyester II in which the I.V. was 1.2 dL/g. In the liquid crystal polyester II, the mole percentages of the repeating units represented by formulae (1) and (2) according to the present disclosure were 15% and 10%, respectively, and were calculated by dividing the number of moles of the p-aminobenzoic acid or the number of moles of the 4,4'-cyclopentylene biphenol that may be regarded as a limiting reagent respectively by the number of moles of total reactants (excluding the acetic anhydride).

Synthesis Example 3

99.7 g (0.60 mol) of m-phthalic acid, 158.1 g (0.84 mol) of 6-hydroxy-2-naphthoic acid, 49.4 g (0.36 mol) of p-aminobenzoic acid, 89.4 g (0.48 mol) of 4,4'-dihydroxy diphenyl, 42.3 g (0.12 mol) of 1,1-bis(4-hydroxyphenyl)cyclododecane (product name in Honshu Chemical Industry: BisP- CDE) and 269.5 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and acetic acid and unreacted acetic anhydride were distilled off at the same time. Subsequently, the residual acetic acid was removed by vacuuming at 300° C. When the torque rose rapidly, the reaction was terminated, and reactants were discharged to obtain a liquid crystal polyester III in which the I.V. was 0.9 dL/g. In the liquid crystal polyester III, the mole percentages of the repeating units represented by formulae (1) and (2) according to the present disclosure were 15% and 5% respectively, and were calculated by dividing the number of moles of the p-aminobenzoic acid or the number of moles of the 1,1-bis(4-hydroxyphenyl)cyclododecane that may be regarded as a limiting reagent respectively by the number of moles of total reactants (excluding the acetic anhydride).

Synthesis Example 4

99.7 g (0.60 mol) of m-phthalic acid, 158.1 g (0.84 mol) of 6-hydroxy-2-naphthoic acid, 49.4 g (0.36 mol) of p-aminobenzoic acid, 67.0 g (0.36 mol) of 4,4'-dihydroxy diphenyl, 64.4 g (0.24 mol) of 4,4'-cyclohexylene biphenol and 269.5 g of acetic anhydride were added to a reactor equipped with a reflux device, a stirrer, a torque meter, a thermometer and a nitrogen introduction tube. After replacing with nitrogen, the internal temperature of the reactor was increased to 150° C., and a reflux reaction was performed for 3 h. Then, the temperature of the reactor was increased to 300° C. within 3 h, and acetic acid and unreacted acetic anhydride were distilled off at the same time. Subsequently, the residual acetic acid was removed by vacuuming at 300° C. When the torque rose rapidly, the reaction was terminated, and reactants were discharged to obtain a liquid crystal polyester IV in which the I.V. was 1.1 dL/g. In the liquid crystal polyester IV, the mole percentages of the repeating units represented by formulae (1) and (2) according to the present disclosure were 15% and 10% respectively, and were calculated by dividing the number of moles of the p-aminobenzoic acid or the number of moles of the 4,4'-cyclohexylene biphenol that may be regarded as a limiting reagent respectively by the number of moles of total reactants (excluding the acetic anhydride).

Synthesis Example 5

99.7 g (0.60 mol) of m-phthalic acid, 225.8 g (1.2 mol) of 6-hydroxy-2-naphthoic acid, 54.4 g (0.36 mol) of 4-acetamidophenol, 61.0 g (0.24 mol) of 4,4'-cyclopentylene biphenol and 229.1 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and acetic acid and unreacted acetic anhydride were distilled off at the same time. Subsequently, the residual acetic acid was removed in by vacuuming at 300° C. When the torque rose rapidly, the reaction was terminated, and reactants were discharged to obtain a liquid crystal polyester V in which the I.V. was 1.1 dL/g. In the liquid crystal polyester V, the mole percentages of the repeating units represented by formulae (1) and (2) according to the present disclosure were 15% and 10% respectively, and were calculated by dividing the number of moles of the 4-acetamidophenol or the number of moles of the 4,4'-cyclopentylene biphenol that may be regarded as a limiting reagent respectively by the number of moles of total reactants (excluding the acetic anhydride).

Synthesis Example 6 (for Comparative Example 1)

158.1 g of 2-hydroxy-6-naphthoic acid, 49.4 g of p-aminobenzoic acid, 99.7 g of m-phthalic acid, 111.7 g of 4,4'-dihydroxy diphenyl and 309.9 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and acetic acid and unreacted acetic anhydride were distilled off at the same time. Subsequently, the residual acetic acid was removed in by vacuuming at 300° C. When the torque rose rapidly, the reaction was terminated, and reactants were discharged to obtain a liquid crystal polyester VI in which the I.V. was 0.9 dL/g. In the liquid crystal polyester VI, the mole percentage of the repeating unit represented by formula (1) according to the present disclosure was 15%, and was calculated by dividing the number of moles of the p-aminobenzoic acid that may be regarded as a limiting reagent by the number of moles of total reactants (excluding the acetic anhydride). The liquid crystal polyester VI does not contain the repeating unit represented by formula (2).

Synthesis Example 7 (for Comparative Example 2)

112.9 g of 2-hydroxy-6-naphthoic acid, 82.3 g of p-aminobenzoic acid, 99.7 g of m-phthalic acid, 111.7 g of 4,4'-dihydroxy diphenyl and 269.5 g of acetic anhydride were added to a reactor equipped with a reflux device, a stirrer, a torque meter, a thermometer and a nitrogen introduction tube. After replacing with nitrogen, the temperature was increased to 150° C., and a reflux reaction was performed for 3 h. Then, the temperature was increased to 300° C. within 3 h, and acetic acid and unreacted acetic anhydride were distilled off at the same time. Subsequently, the residual acetic acid was removed in by vacuuming at 300° C. When the torque rose rapidly, the reaction was terminated, and reactants were discharged to obtain a liquid crystal polyester VII in which the I.V. was 1.0 dL/g. In the liquid crystal polyester VII, the mole percentage of the repeating unit represented by formula (1) according to the present disclosure was 25%, and was calculated by dividing the number of moles of the p-aminobenzoic acid that may be regarded as a limiting reagent by the number of moles of total reactants (excluding the acetic anhydride). The liquid crystal polyester VII does not contain the repeating unit represented by formula (2).

Examples 1-5

100 g of the liquid crystal polyester obtained by the synthesis examples 1-5 was respectively added to 900 g of N-methyl-2-pyrrolidone (NMP), and heated at 140° C. for 4 h to obtain a liquid crystal polyester solution. This solution was applied to a copper foil of 18 μm through a blade coater and then baked at 150° C. for 10 min to remove the solvent. Then, the temperature was increased to 300° C. under a nitrogen environment for heat treatment which was maintained at 300° C. for 3 h. The copper foil was removed by a ferric chloride etching solution, and clean washing was performed to obtain a liquid crystal polyester film. After cutting the film into an appropriate size, the hygroscopicity and the dielectric property, i.e., the dissipation factor, were measured.

Comparative Examples 1-2

100 g of the liquid crystal polyester obtained by the synthesis examples 6-7 was respectively added to 900 g of N-methyl-2-pyrrolidone (NMP), and heated at 140° C. for 4 h to obtain a liquid crystal polyester solution. This solution was applied to a copper foil of 18 μm through a blade coater and then baked at 150° C. for 10 min to remove the solvent. Then, the temperature was increased to 300° C. under a nitrogen environment for heat treatment which was maintained at 300° C. for 3 h. The copper foil was removed by a ferric chloride etching solution, and clean washing was performed to obtain a liquid crystal polyester film. After cutting the film into an appropriate size, the hygroscopicity and the dielectric property, i.e., the dissipation factor, were measured.

Evaluation of Solution Stability

The liquid crystal polyester solutions obtained in the above-mentioned Examples 1-5 and Comparative Examples 1-2 were placed at a constant temperature of 25° C., and the initial viscosity of the solutions was measured by using a rotary viscometer [Brookfield, DV2T] at 60 rpm. After standing for one month, the viscosity of the solutions was measured again under the same conditions to obtain the static viscosity. The viscosity change was calculated by the following formula (1). If the viscosity change was less than 50%, it was represented by "O", and if the viscosity change was greater than 50%, it was represented by "X".

$$\text{Viscosity change (\%)} = \frac{\text{Static viscosity} - \text{Initial viscosity}}{\text{Initial viscosity}} \times 100\%$$

Hydroscopicity Measurement

After the copper foil was removed, the liquid crystal polyester film was immersed in a water bath at a constant temperature of 25° C. After standing for 24 h, the liquid crystal polyester film was taken out, the surface water was removed by airlaid paper, and then, the liquid crystal polyester film was weighed to obtain a water absorption weight. The water-absorbed liquid crystal polyester film was baked at 120° C. for 1 h and then was taken out and stood in a drying oven until reaching room temperature, and then, the liquid crystal polyester film was weighed to obtain a dry weight. The hygroscopicity may be calculated by the following formula (2).

$$\text{Hygroscopicity (\%)} = \frac{\text{Water absorption weight} - \text{Dry}}{\text{Dry weight}} \times 100\%$$

Dissipation Factor Measurement

After the copper foil was removed, the liquid crystal polyester film was measured by a Japanese microwave dielectric constant meter (AET) to obtain a dissipation factor (Df).

Table 1 shows the evaluation results of the stability of the liquid crystal polyester solutions in the Examples and the Comparative Examples of the present disclosure, as well as the hygroscopicity and the dielectric property of the obtained liquid crystal polyester films.

TABLE 1

|  | Ex 1 | Ex 2 | Ex 3 | Ex 4 | Ex 5 | Compara. Ex 1 | Compara. Ex 2 |
|---|---|---|---|---|---|---|---|
| Viscosity stability | O | O | O | O | O | X | O |
| Hygroscopicity % | 0.18 | 0.21 | 0.21 | 0.20 | 0.22 | 0.20 | 0.46 |
| Dissipation factor (Df) @10 GHz | 0.0041 | 0.0040 | 0.0042 | 0.0040 | 0.0042 | 0.0039 | 0.0048 |

As shown in table 1, the liquid crystal polyester solution of the present disclosure exhibits superior viscosity stability. In addition, the liquid crystal polyester film of the present disclosure remarkably exhibits superior hygroscopicity (<0.25%), and still has an excellent low dissipation factor (D), even at a frequency up to 10 GHz.

The constituent monomers of the liquid crystal polyester in Comparative Example 1 are similar to those in Examples 1-5; the difference is that Comparative Example 1 does not use aromatic diol containing

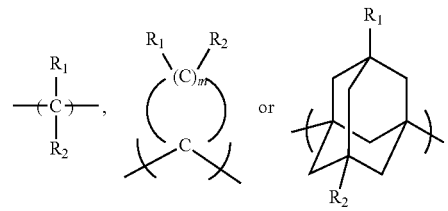

in the structure, and therefore, the liquid crystal polyester in Comparative Example 1 does not have the repeating unit represented by formula (2). The results show that the liquid crystal polyester in Comparative Example 1 has poor stability in the solution.

Unlike Comparative Example 1, Comparative Example 2 attempts to improve the stability of the liquid crystal polyester in the solution by increasing the amount of amino-containing aromatic monomers. The results show that although the stability is improved, the hydroscopicity and dissipation factor of the obtained liquid crystal polyester film are greatly increased, which is not conducive to applications in a high-frequency circuit product.

What is claimed is:
1. An aromatic liquid crystal polyester, comprising repeating units represented by formulae (1) and (2), respectively:

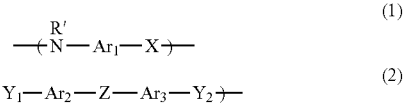

wherein

X is —C(=O)—, —O— or —NR'—, wherein R' is H or alkyl having 1 to 4 carbon atoms;

Ar$_1$ is divalent aryl selected from the group consisting of phenylene, naphthylene, biphenylene and

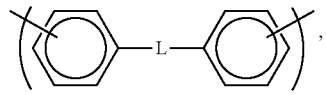

wherein L is —O—, —S—, —S(=O)$_2$—, —C(=O)— or C$_1$-C$_4$ alkylene, and the aryl moiety in Ar$_1$ may be unsubstituted or substituted with alkyl having 1 to 4 carbon atoms, alkoxyl having 1 to 4 carbon atoms, aryl having 6 to 20 carbon atoms, or halogen;

Ar$_2$ and Ar$_3$ may be the same or different, each comprises a divalent aryl moiety independently selected from the group consisting of phenylene, naphthylene and biphenylene, wherein the divalent aryl moiety in Ar$_2$ and Ar$_3$ may be unsubstituted or substituted with alkyl having 1 to 4 carbon atoms, alkoxyl having 1 to 4 carbon atoms, aryl having 6 to 20 carbon atoms, or halogen;

Y$_1$ and Y$_2$ are independently selected from the group consisting of —O—, —NH— or —C(=O)—; and Z is

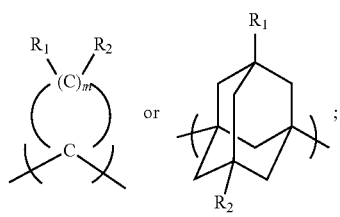

wherein R$_1$ and R$_2$ are the same or different and independently selected from the group consisting of a hydrogen atom, alkyl having 1 to 8 carbon atoms, an aryl group having 6 to 15 carbon atoms, and halogen;

m is any integer from 4 to 13, wherein the repeating unit represented by formula (1) accounts for 10 to 35 mole percentage in the aromatic liquid crystal polyester; and the repeating unit represented by formula (2) accounts for 1 to 9 mole percentage in the aromatic liquid crystal polyester.

2. The aromatic liquid crystal polyester according to claim 1, wherein Z is

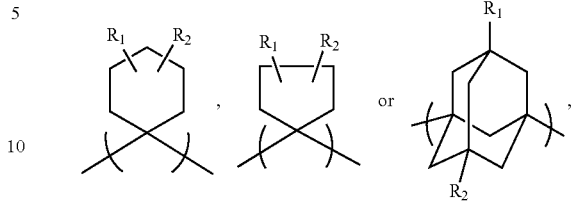

wherein R$_1$ and R$_2$ are the same or different and are independently selected from the group consisting of a hydrogen atom, alkyl having 1 to 8 carbon atoms, an aryl group having 6 to 15 carbon atoms, and halogen.

3. The aromatic liquid crystal polyester according to claim 1, wherein Y$_1$ and Y$_2$ are —O—.

4. The aromatic liquid crystal polyester according to claim 1, which is composed of the following monomers:
   (i) a monomer of aromatic aminocarboxylic acid having an aryl moiety Ar$_1$; and
   (ii) an aromatic diol monomer having a formula HO—Ar$_2$—Z—Ar$_3$—OH,
   wherein Z, Ar$_1$, Ar$_2$ and Ar$_3$ are those as defined in claim 1.

5. A liquid crystal polyester composition, comprising an aromatic liquid crystal polyester according to claim 1 and a solvent.

6. The liquid crystal polyester composition according to claim 5, wherein the solvent is N-methyl-2-pyrrolidone, N,N-dimethylacetamide, γ-butyrolactone, or dimethyl formamide.

7. The liquid crystal polyester composition according to claim 5, further comprising a filler selected from an organic filler, an inorganic filler and a combination thereof.

8. A method for manufacturing a liquid crystal polyester film, comprising:
   applying the liquid crystal polyester composition according to claim 5 onto a carrier plate to form a coating;
   removing the solvent from the coating; and
   performing heat treatment to melt the liquid crystal polyester and form a liquid crystal polyester film.

* * * * *